US005217316A

United States Patent [19]

Ojima

[11] Patent Number: 5,217,316

[45] Date of Patent: Jun. 8, 1993

[54] SLOW-ACTING ROTATION SHAFT DEVICE

[75] Inventor: Juji Ojima, Aikawa, Japan

[73] Assignee: NHK Spring Co., Ltd., Kanagawa, Japan

[21] Appl. No.: 773,271

[22] Filed: Oct. 9, 1991

[30] Foreign Application Priority Data

Oct. 12, 1990 [JP] Japan .......... 2-274251
Oct. 12, 1990 [JP] Japan .......... 2-274252

[51] Int. Cl.[5] .......... F16C 11/00

[52] U.S. Cl. .......... 403/120; 403/91; 403/163; 403/24; 403/113; 16/308; 16/280; 16/342; 248/923

[58] Field of Search .......... 16/308, 75, 337, 342, 16/341, 340, 278, 280, 374, 376; 248/923, 372.1, 918, 919, 922; 403/161, 163, 120, 145, 146, 149, 91-93, 95, 113, 112, 84, 117, 24

[56] References Cited

U.S. PATENT DOCUMENTS 4,453,728 6/1984 Verge .......... 16/305 X
4,603,830 8/1986 Franck .......... 16/308 X
4,624,434 11/1986 Lake, Jr. et al. .......... 248/923 X
5,081,742 1/1992 Kobayashi .......... 16/337
5,088,156 2/1992 Hosoi .......... 16/337 X
5,109,570 5/1992 Okada et al. .......... 16/337 X

*Primary Examiner*—Andrew V. Kundrat
*Assistant Examiner*—Harry C. Kim
*Attorney, Agent, or Firm*—Keck, Mahin & Cate

[57] ABSTRACT

A one piece shaft which supports two rotatable members is provided with shafts for energizing the rotation and for controlling an energized force of each member separately. The shaft includes a shaft body which connects two hollow shaft bodies attached to each rotatable member unrotatably on the same central shaft axis so as to rotate relatively, two members attached unrotatably to the fixed member attached rotatably to both sides of this shaft, and two torsion bars bridged between the separated hollow shaft bodies and the cap member respectively. The shaft makes possible providing the initial torque to each torsion bar at the assembling time of the shaft by being provided with a latching projection formed on one hollow shaft body, projections for stopping the rotation formed on both cap members and a latching pawl formed on the other hollow shaft body, and it is possible to prevent problems with respect to the rotation of the rotatable member and a rotation more than a range of the normal rotation by the shaft itself.

2 Claims, 9 Drawing Sheets

(b)

SLOW-ACTING ROTATION SHAFT DEVICE

BACKGROUND OF THE INVENTION

This invention relates to a slow-acting rotation shaft device which rotatably supports first and second rotative portions which rotate relatively to a fixed member.

As a switch device having two rotative members which thus independently rotate, there exists a case for a compact disc, a compact case for toiletries or the like, and these are used for a rotatably supporting portion of the two rotative shaft members in the slow-acting rotation shaft of this invention.

A conventional switch device having two rotative members which rotate independently is used with only one rotative member of the slow-acting rotation shaft device as shown in FIG. 8(*a*) and (*b*).

In FIG. 8(*a*) and (*b*), the switch device is incorporated so that first and second members 1*a* and 2*a* may relatively rotate with respect to a fixed member 2. In this case, the slow-acting rotation shaft device is constructed by a shaft 3 incorporated at the rotatably supporting portion of each rotative member 1*a* and 1*b*.

This shaft body 3 comprises a hollow shaft body 31, cap members 32 and 33 outwardly inserted rotatably at both sides of the shaft body 31, a torsion bar 4 which latches one end hook portion thereof in the shaft body 31 and another hook portion 42 thereof in the cap member 33, and a viscous grease (not shown) enclosed between the shaft body 31 and the cap members 32, 33.

The shaft body 31 is formed by a stepped shaft having small diameter portions 31*b*, 31*b* at both sides of a large diameter shaft portion 31 positioned at a central portion thereof, said small diameter portions 31*b*, 31*b* being outwardly inserted cap members 32 and 33 rotatably. Further, a slit penetrated hole 34 is format in a longitudinal direction and a key 35 is protruded at a large shaft portion 31*a*.

Each of the cap members 32 and 33 is provided with a cylinder form having a bottom, said inner and outer diameters thereof are formed to be approximately equal to the outer diameter of the small diameter shaft portion 31*b* and the outer diameter of the large diameter shaft portion 31*a* respectively, while outer circumferences of the cap members 32 and 33 are provided with projected keys 37 and 38 respectively.

At the bottom of the cap member 33, a concave slit 36 is formed. The cap members 32 and 33 are outwardly inserted to the small diameter shaft portions 31*b* and 31*b* respectively, ring grooves 32*a* and 33*a* of said cap members 32 and 33 being inserted into rib 31*c* of each small diameter shaft portion 31*b* to prevent the drawing out of the cap members 32 and 33, thereby being incorporated to the shaft body 31 rotatably.

In this incorporated state, the torsion bar 4 is inserted into the penetrated hole 34 to latch one end of the hook portion 41 to the penetrated hole 34 and another end of the hook portion 42 to the concave 36 of the cap portion 33 in order to incorporate therewith, and further the viscous grease is enclosed between the cap members 32 and 33 and each small diameter shaft portion 31*b*.

The shaft 3 thus incorporated is positioned the large diameter shaft portion 31*a* of the shaft body 31 in a shaft supporting portion 11*a* (11*b*) of the rotative portion 1*a* (1*b*) and further positioned the ca members 32 and 33 in bearing portions 21 (23) and 22 (24) of the fixed member 2 respectively, while each key 35, 37 and 38 is inserted into key grooves formed at a shaft supporting portion 11*a* (11*b*), a bearing portions 21 (23) and 22 (24) respectively whereby the large diameter shaft portion 31*a* and the cap members 32, 33 are unrotatably attached to the shaft supporting portion 11*a* (11*b*) and the bearing portion 21 (23) and 22 (24) respectively.

In the conventional slow-acting rotation shaft device thus constructed, though the rotative members 1*a* and 1*b* rotate by the torque of the torsion bar 4, this rotation can be performed with a slow speed in spite of the torque load of the torsion bar 4 due to the viscous resistance of the viscous grease at the time of this rotation.

However, the conventional slow-acting rotation shaft device is only provided a function which rotates one rotative member relatively rotates with respect to the fixed member with slow speed. Accordingly, it is necessary to provide two pieces (two shafts type) in the above switch device having two rotation members.

For this object, in the switch device having two rotative members, a space for arranging the slow-acting rotative shaft device must be secured widely. Accordingly, it is difficult to apply a slow-acting rotative shaft device to a small switch device such as a compact case for toiletries, a case for a compact disc or the like which is difficult to secure the space for arranging.

Further, this includes a problem to increase a cost for arrangement of a plurality of the slow-acting rotation shaft device.

Furthermore, this includes the following problems since in the conventional slow-acting rotation shaft device, the shaft body 31 and the cap member 33 which constitutes the shaft 3 are incorporated rotatably with respect to each other:

(1) to provide an initial torque to the torsion bar 4 is impossible at the time of assembly of the shaft 3. It is possible for the first time to provide it in the relation of the rotative members 1*a*, 1*b* and the fixed member 2 at the time of assembling the shaft 3 to the rotatably supporting portions of the rotative members 1*a*, 1*b*. Accordingly, the incorporation thereof is difficult.

(2) Although a twisting direction of the torsion bar 4 at the time of use is constrained by setting, there exists a fear that a permanent set of the torsion bar 4 will occur by a mistaken operation of the cap member 33 in the opposite direction against the above direction.

(3) Since the permanent set of the torsion bar 4 occurs by the rotation more than the maximum, rotation angle because the shaft 3 itself has no means which constrains a rotation angle, it is necessary to provide the above means to the rotative members 1*a*, 1*b* and the fixed member 2, which causes a troublesome of working to the rotative members 1*a* and 1*b* and the fixed member 2.

This invention is performed in view of the above reasons. The first object is to provide a slow-acting rotation shaft device having one shaft type which is possible to control the speed in each of two rotative members and is not necessary for a large setting space. Further, a second object of this invention is to provide a slow-acting rotation shaft device which is a one-shaft type one possible to provide an initial torque to the torsion bar at the time of assembly of the shaft and can prevent a mistaken operation and the rotation more than the maximum, rotation angle by shaft itself.

SUMMARY OF THE INVENTION

In order to attain the first object described above, the slow-acting rotation shaft device of this invention is characterized by a shaft which supports rotatably first and second rotative members which relatively rotate with respect to a fixed member, said shaft comprises: a shaft body having a first hollow shaft body latched to the first rotative member unrotatably and a second hollow shaft body inserted into the first hollow shaft body rotatably and latched to the second rotative member unrotatably; two cap members inserted into the first and the second hollow shaft body side end portions respectively and rotatably and attached to the fixed member unrotatably; torsion bars wherein each one end portion thereof is respectively latched to one cap member of two cap members and the second hollow shaft body, and to another cap member and the first hollow shaft body; and a viscous grease enclosed between the first hollow shaft body and the second hollow shaft body.

Further, in order to attain the second object, the slow-acting rotation shaft device of this invention is characterized by comprising; latching projections projectively formed in axial directions at both side ends of the first hollow shaft body respectively; projections for stopping the rotation projectively formed at both cap members so as to latch from the same rotative direction to these latching projections; and a latching pawl projected in a diameter direction of the second hollow shaft body so as to latch to the latching projection of the first hollow shaft body which latches with the projection for stopping the rotation of another cap member.

Since this invention is constituted as described above, the first and second hollow shaft bodies constitute one shaft and these rotate integrally with the first and the second rotative members. This rotation is performed by a spring torque of the torsion bar. When the rotation speed between both hollow shaft bodies generates the difference, these undergo the viscous resistance of the viscous grease enclosed in both hollow bodies.

The first and second rotative members rotate with slow speed in spite of the torque load of the torsion bar due to the viscous resistance.

Further, in the slow-acting rotation shaft device provided with a latching projection, a projection for stopping the rotation, and a latching pawl, the rotation of the first rotative member is applied to opening operation at the same time or before the rotation of the second rotative member and to shutting operation at the same time or after that of the second rotative member. The maximum opening angle of the first rotative member at this time is constrained by the fact that the latching projection formed at both ends of the first hollow shaft body abuts against the projection for stopping the rotation of the cap member at one end or another end attached unrotatably to the bearing portion of the fixed member.

The torsion bar wherein the both ends thereof are latched to the one side cap member and the second hollow shaft body rotatively energizes the one side cap member and the second hollow shaft body in the opposite directions from each other.

In the one side cap member and the second hollow shaft body which rotate by this energized rotation, the projection for stopping the rotation and the latching pawl respectively formed at said cap member and the second hollow shaft body abut against each latching projection located at both ends of the first hollow shaft body from the opposite side respectively whereby the above rotation is stopped. By stopping the rotation of the one side cap member and the second hollow shaft body, the torsion bar latched between the one side cap member and the second hollow shaft body can be provided the initial torque.

Further, the torsion bar wherein the both ends thereof are latched to another cap member and the first hollow shaft body energizes rotatively another cap member and the first hollow shaft body in the opposite directions from each other. By this rotational energizing, the rotating another cap member and the first hollow shaft body abut against the projection for stopping the rotation and the latching projection formed to each one whereby both rotations are stopped. By this stop of the rotation, the torsion bar latched between the another cap portion and the first hollow shaft portion can be provided this initial torque.

Thus, two torsion bars can be provided the initial torque independently with no relation to each other.

BRIEF DESCRIPTION OF THE DRAWINGS

FIG. 2(*a*) is a sectional view along line a—a;

FIG. 2(*b*) is a sectional view along line b—b;

FIG. 2(*c*) is a sectional view along line d—d;

FIG. 2(*e*) is a sectional view along line e—e;

FIG. 2(*f*) is a sectional view along line f—f;

FIG. 2(*g*) is a sectional view along line g—g; and

FIG. 2(*h*) is a sectional view along line h—h.

FIG. 5(*a*) is a elevation view;

FIG. 5(*b*) is a left side view;

FIG. 5(*c*) is a perspective view of a material portion of a second hollow body which constitutes the above shaft;

FIG. 5(*d*) is a transverse sectional view along line d—d of FIG. 5(*a*).

FIG. 7(*a*) is a sectional view along line a—a;

FIG. 7(*b*) is a sectional view along line b—b;

FIG. 7(*c*) is a sectional view along line c—c;

FIG. 7(*d*) is a sectional view along line d—d;

FIG. 7(*e*) is a sectional view along line e—e;

FIG. 7(*f*) is a sectional view along line f—f;

FIG. 7(*g*) is a sectional view along line g—g; and

FIG. 7(*h*) is a sectional view along line h—h.

FIG. 8(*a*) is a perspective view of the switch device; and

FIG. 8(*b*) is a perspective view of the rotative member in the above switch device.

FIG. 10(*b*) is a sectional view along the line b—b of the shaft of a conventional device; and FIG. 10(*c*) is a left side view of another cap member of the shaft of the conventional device.

DETAILED DESCRIPTION OF THE INVENTION

This invention will be described with reference to an illustrated embodiment as follows.

Figure 1:
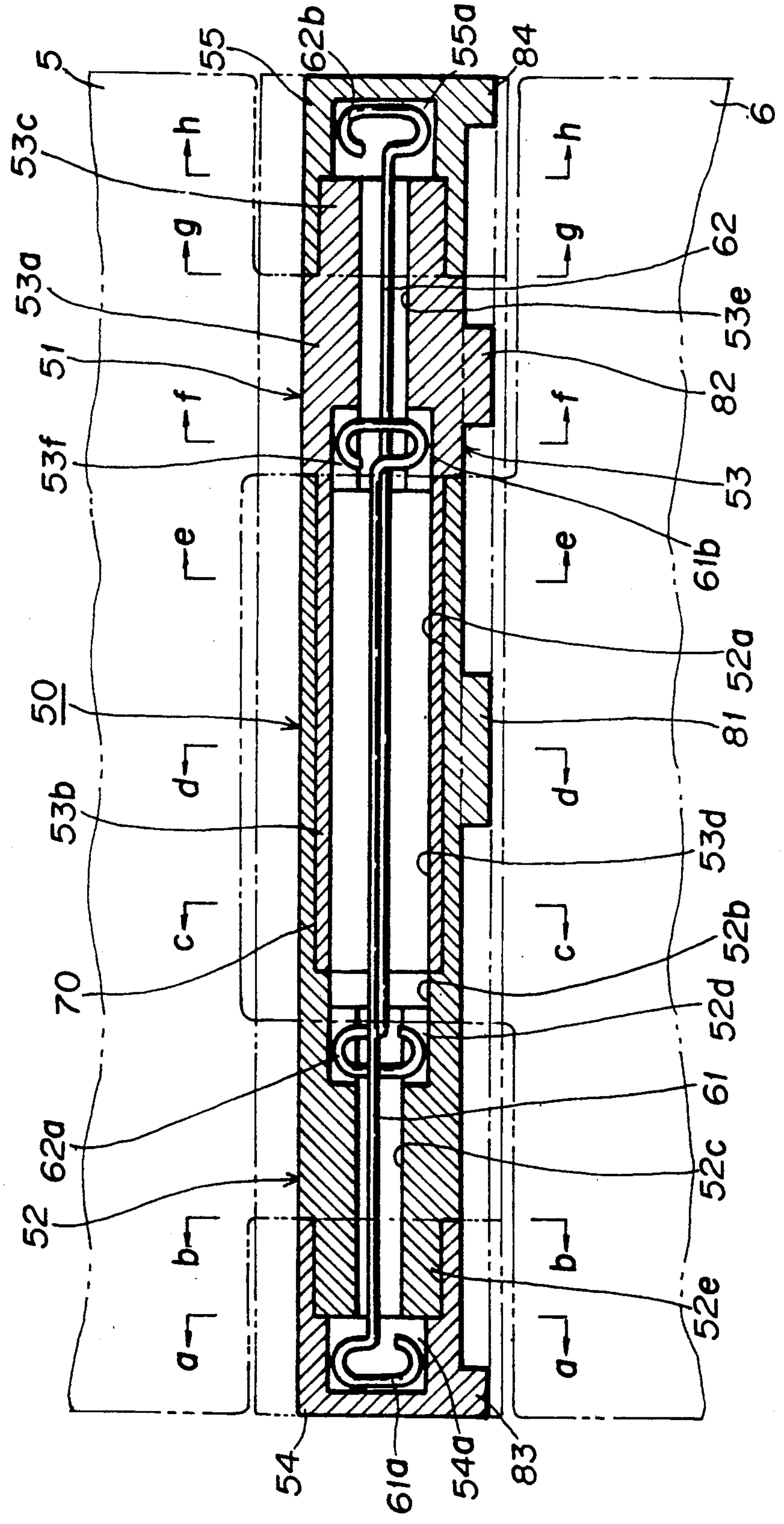
FIG. 1 is a longitudinal sectional view which constitutes a slow-acting rotation shaft device of an embodiment according to this invention.
Figure 2A:
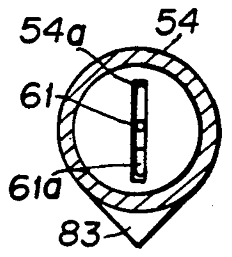
FIG. 2(*a*) through (*h*) are transverse sectional views of the shaft of FIG. 1, as follows.
Figure 2B:
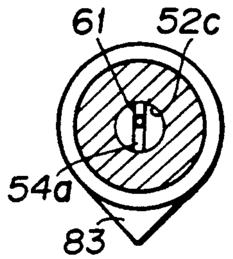
Figure 2C:
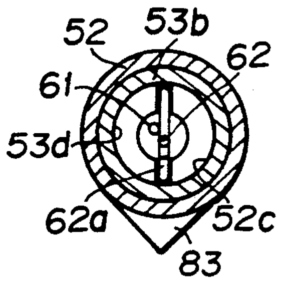
Figure 2D:
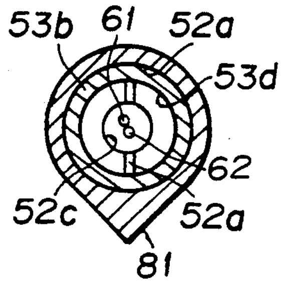
Figure 2E:
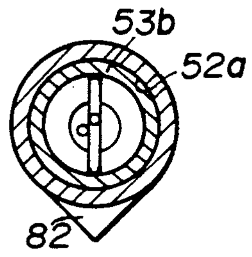
Figure 2F:
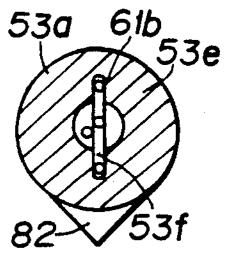
Figure 2G:
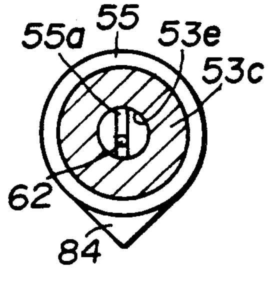
Figure 2H:
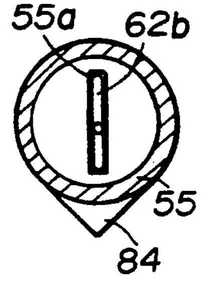

FIG. 1 shows a shaft 50 of a slow-acting rotation shaft device. The shaft 50 includes a shaft body 51, cap members 54 and 55 inserted into both sides of the shaft body 51, torsion bars 61 and 62 inserted in the shaft body 51, and a viscous grease 70 enclosed in the shaft body 51.

The shaft body 51 is constructed so that a first hollow shaft body 52 and a second hollow shaft body 53 may be inserted on the same central shaft line rotatably each other.

The first hollow shaft body 52 is provided with a penetrated hole wherein a large diameter circular hole 52*a*, a middle diameter circular hole 52*b* and a small diameter circular hole 52*c* are interconnected stepwise from the right side to the left side in FIG. 1, and a key 81 formed projectively at the outside of the shaft portion in the large diameter circular hole 52*a* portion, at the interconnected portion of the middle diameter circular hole 52*b* and the small diameter circular hole 52*c* being formed a slit 52*d*, further, at an end portion of the small diameter circular hole 52*c* of the first hollow shaft body 52 is formed a small diameter shaft portion 52*c* having a small outer diameter than that of other shaft portion.

The second hollow shaft body 53 consists of a stepped shaft body having small diameter having small diameter shaft portions 53*b*, 53*c* at both sides of the large diameter shaft portion 53*a* and is provided with a penetrated hole wherein a large diameter circular hole 53*a* and the small diameter circular hole 53*e* are interconnected stepwise from the left side to the right side and a key 82 formed projectively at the outside of the large diameter shaft portion 53*a*, at the interconnected portion of the large diameter circular hole 53*d* and the small diameter circular hole 53*e* being formed a slit hole 53*f*. An outer diameter of the large diameter shaft portion 53*a* formed at this time is formed to be approximately the same as the outer diameter of the shaft portion in the first hollow shaft body 52, while the small diameter shaft portion 53*b* is formed so that the outer diameter of the small diameter shaft portion 53*b* may be inserted in the large diameter circular hole 52*a* of the first hollow shaft body 52. Further, the small diameter shaft portion 53*b* of the second hollow shaft body 53 is inserted into the large diameter circular hole 52*a* of the first hollow shaft body 52 whereby the shaft body 51 is formed.

At the time of inserting the small diameter shaft portion 53*b* into this large diameter circular hole 52*a*, when the viscous grease 70 is applied at the outer circumference of the small diameter shaft portion 53*b*, the grease 70 is enclosed between the first hollow shaft body 52 and the second one 53 of the inserted portion at the same time of the insertion.

At both sides of the shaft body 51 thus incorporated, the cap members 54 and 55 are inserted therein. The cap members 54 and 55 are respectively inserted into the small diameter shaft portion 52*e* of the first hollow shaft body 52 and the small diameter shaft portion 53 of the second hollow shaft body 53 rotatably.

Each of cap members 54 and 55 consists of cylinder having of bottom, the outer diameter thereof being approximately the same as that of the shaft portion 53*a* of the first hollow shaft body 52 and the large diameter shaft portion of 53*a* the second hollow shaft body 53*a*, and the inner diameters thereof being formed so as to be able to insert around the small diameter shaft portion 52*e* and 53*c* of each hollow shaft body 52 and 53, the cap members 54 and 55 being formed slit hole 54*a* and 55*a* respectively.

Further, at the outsides of the cylinder bodies of the cap members 54 and 55, keys 83 and 84 are formed projectively.

The shaft 50 thus incorporated is inserted the torsion bars 61 and 62 therein.

The one end of the hook portion 61*a* of the torsion bar 61 is latched to the slit hole 54*a* of the cap member 54, while another end of the hook portion 61*b* is attached to the slit hole 53*f* of the second hollow shaft body.

Further, one end of the hook portion 62*a* of another torsion bar 62 is latched to the slit hole 52*d* of the first hollow shaft body 52, while another end of the hook portion 62*b* is attached to the slit hole 55*a* of the second hollow shaft body.

Thus, in the torsion bars 61 and 62, the spring torques are adapted to operate respectively between the cap member 54 and the second hollow shaft body 53, and between the cap member 55 and the first hollow shaft body 52.

Figure 3:
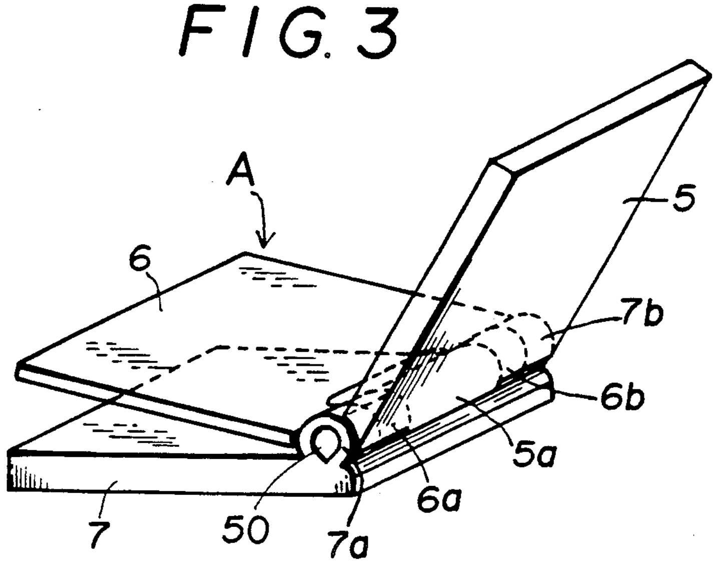
FIG. 3 is a perspective view of a switch device incorporating the above slow-acting rotation shaft device.
Figure 4:
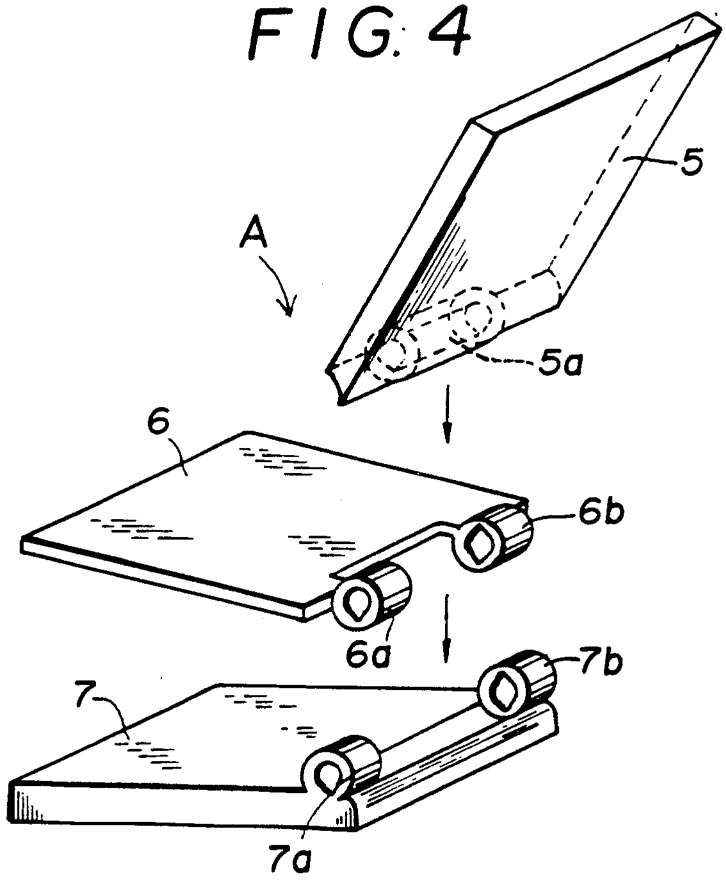
FIG. 4 is an exploded perspective view of the switch device of FIG. 3.

The shaft 50 is attached to a rotatably supporting portion of a switch device A shown in FIG. 3 and FIG. 4.

In the switch device A, an upper lid 5 which is a first rotative member and a middle lid 6 which is a second rotative member are adapted to rotate relatively around the same rotation shaft with respect to the fixed member 7. At this time, the shaft 50 is used as this above rotation shaft.

The shaft 50 is penetrated through a shaft supporting portion 5*a* of the upper lid 5, shaft supporting portions 6*a* and 6*b* of the middle lid 6 and bearing portions 7*a* and 7*b* of the fixed member 7, while keys 81, 82 and 84 are latched to key grooves formed at the shaft supporting portions 5*a*, 5*b* and the bearing portion 7*a* and 7*b* respectively.

In shaft 50 thus attached, the cap members 54 and 55 are attached to the bearing portions 7*a*, 7*b* of the fixed member 7, the first hollow shaft body 52 is attached to the upper lid 5, and the second hollow shaft body 53 is attached to the middle lid 6 respectively and in rotatably. At this time, the upper lid 5 is energized in an opening direction by torsion bar 61.

Thus, the upper and middle lids 5 and 6 rotate in the opening direction by each spring torque or each torsion bar 62 and 61 and the viscous resistance of the viscous grease 70 occurs by this rotation.

In case of either:

operating the upper lid 5 in the opening direction in a state wherein the middle lid 6 is locked in a whole state;

operating the middle lid 6 in the open direction in a whole opening state of the upper lid 5; or operating the upper lid 5 with higher speed than the operating speed of the middle lid 6;

the viscous resistance occurs whereby upper lid 5 and the middle lid 6 are opened in spite of the spring torque of the torsion bar.

When the upper lid 5 and the middle lid 6 are shut, both lids are operated in the shutting direction at the same time. Accordingly, the above operation is performed at a stretch against the spring torque of the torsion bars 61 and 62 without relation of the viscous resistance of the viscous grease 70.

Further, to provide the initial torque to the torsion bars 51 and 62 is performed as follows:

The attachment of the shaft 50 to the rotatably supporting portion of the upper lid 5 and the middle lid 6 is performed in a state wherein either one of the both side ends of the shaft 50 is projected to the outward of the switch device.

In other words in order to provide the initial torque to the torsion bar 61, it is performed by removing the attaching state of the cap member 54 and the bearing portion 7a projected the side end portion of the cap member, 54 outward of the switch device A, twisting the torsion bar 61 suitably by rotating the cap member 54, and then pushing the shaft 50 in the rotatably supporting portion as it is thereby attaching the cap member 54 to the bearing portion unrotatably.

Further, in order to provide the initial torque to the torsion bar, the attaching state of the cap member 55 and the bearing portion 7b is adapted to release by projecting the cap member 55 to outward of the switch device thereby performing by the same way as the torsion bar 61 described above.

Thus, in this embodiment the torsion bars 62 and 61 can be provided the initial torque independently without relation each other by operating the above torsion bars separately which relate to the upper lid 5 and the middle lid 6. By this reason, the torsion bars 62 and 61 may be provided initial torques having different torque respectively.

In this embodiment, though one piece of the torsion bar is used for each torsion bar 61 and 62 respectively, a plurality of torsion bars can be used according to the torque requested.

Then, other embodiments of this invention shown in FIG. 5 to FIG. 7 will be described as follows.

The shaft 50 of the slow-acting rotation shaft device as in the other embodiment includes a shaft body 51, cap members 54 and 55 outwardly inserted around the both sides of the shaft body 51, torsion bars 61 and 62 inserted innerly to the shaft body 51 and a viscous grease 70 enclosed in the shaft body 51.

The first hollow shaft body 52 is provided with a penetrated hole wherein a large diameter circular hole 52a, a middle diameter circular hole 52b and a small diameter circular hole 52c are interconnected therethrough, a key 81, a slit hole 52d, and a small diameter shaft portion 52e at the side end portion of the small diameter circular hole 52c. (See FIG. 6.)

Further, at both side end surfaces of the first hollow shaft body 52, latching projections 71 and 72 are projectively formed in the shaft portion respectively. In this case, the latching projection 71 is formed at the stepped portion of the first hollow body 52 formed at the small diameter shaft portion 52e (please see FIG. 5(*a*)).

Figure 6:
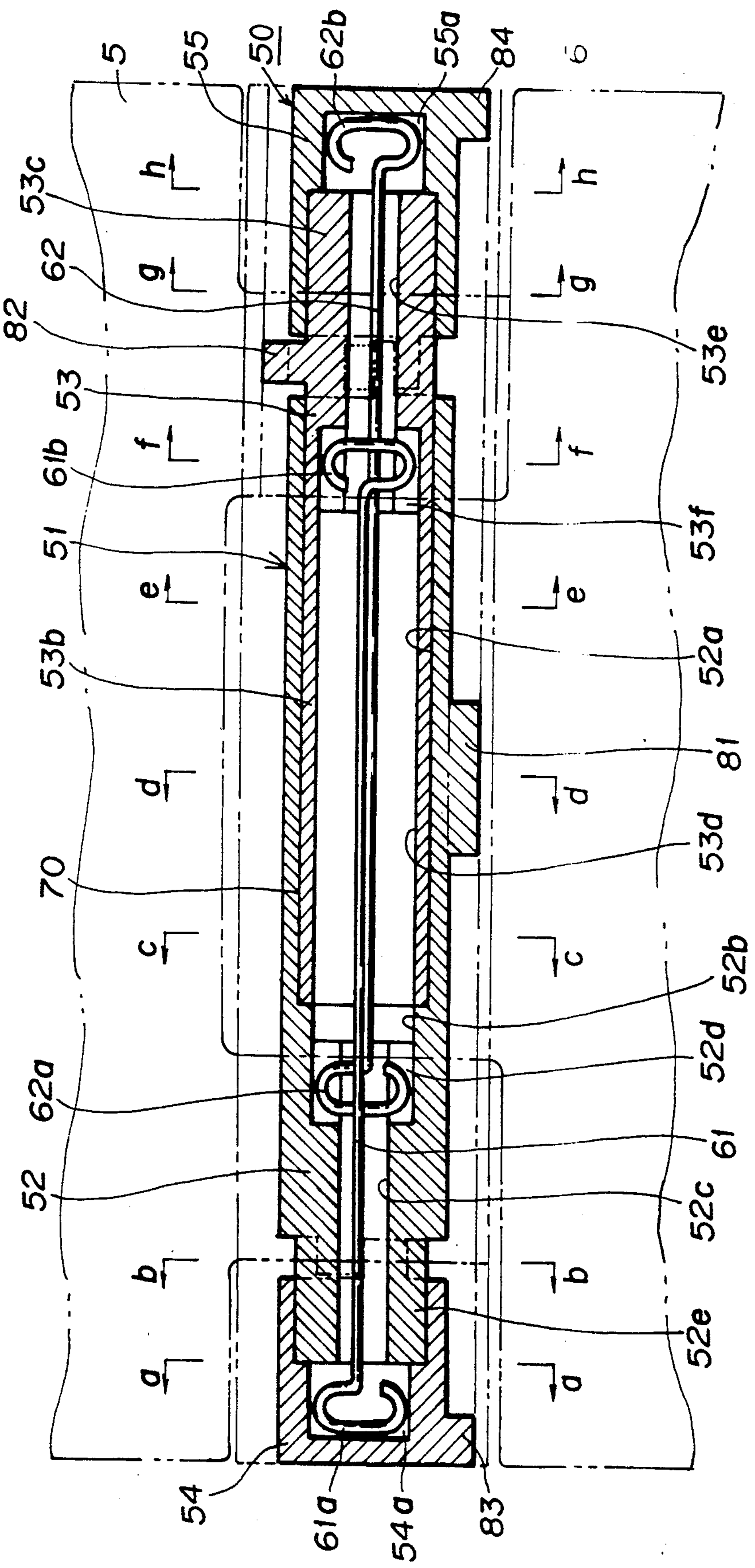
FIG. 6 is a longitudinal view along line vi—vi of FIG. 5(*b*).
Figure 7A:
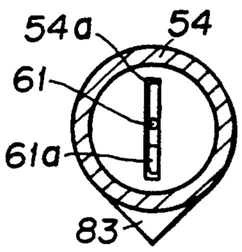
FIG. 7 shows views of a transverse sectional surface of FIG. 6, as follows.
Figure 7B:
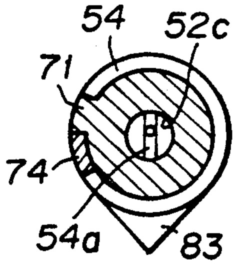
Figure 7C:
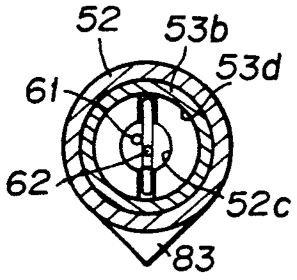
Figure 7D:
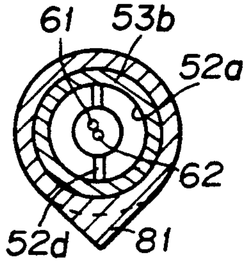
Figure 7E:
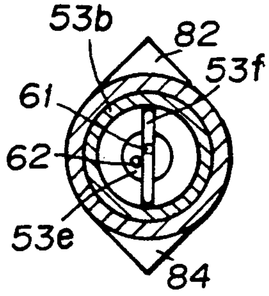
Figure 7F:
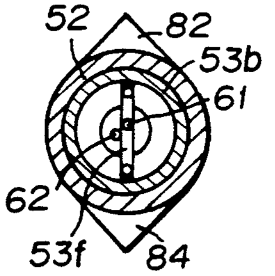
Figure 7G:
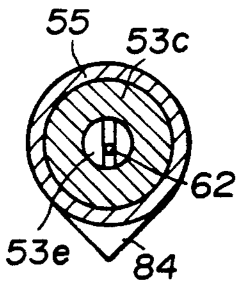
Figure 7H:
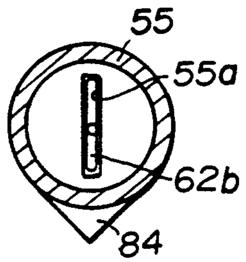
Figure 8A:
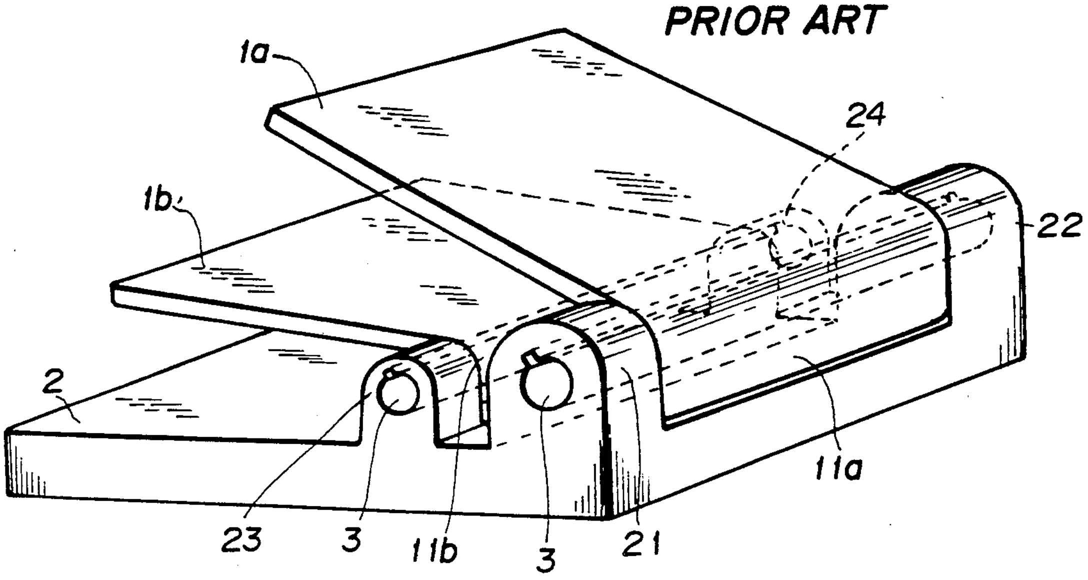
FIG. 8(a) PRIOR ART
FIG. 8 shows a switch device incorporating a conventional slow-acting rotation shaft device, as follows.
Figure 8B:
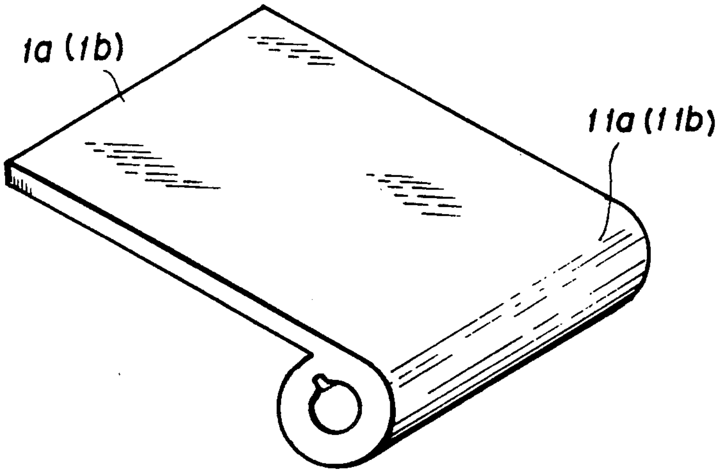
FIG. 8(b) PRIOR ART
Figure 9:
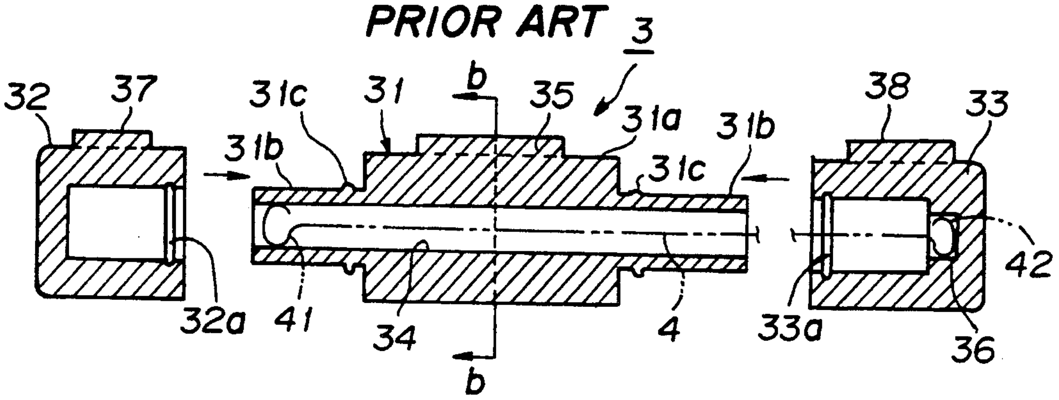
FIG. 9 PRIOR ART
FIG. 9 is an exploded longitudinal sectional view of a shaft of a conventional rotation shaft device.
Figure 10:
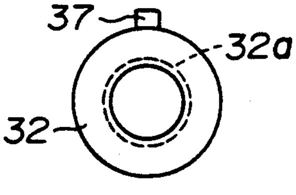
FIG. 10 (a) PRIOR ART
FIG. 10(*a*) is a right side view of one side cap member of a shaft of a conventional device.
Figure 10:
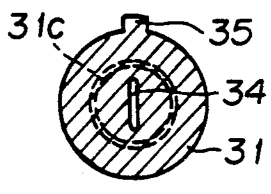
FIG. 10 (b) PRIOR ART
Figure 10:
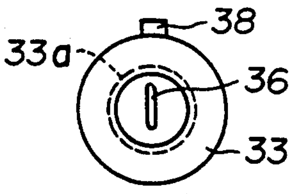
FIG. 10 (c) PRIOR ART

The second hollow shaft body 53 is provided with a penetrated hole therein wherein a large diameter circular hole 53d and a small diameter circular hole 53e are interconnected stepwise from the left side to the right side in FIG. 6, said second hollow shaft body 53 being formed so that the outer diameter thereof may be inserted into a large diameter circular hole 52a of the second hollow shaft body 52.

Figure 5A:
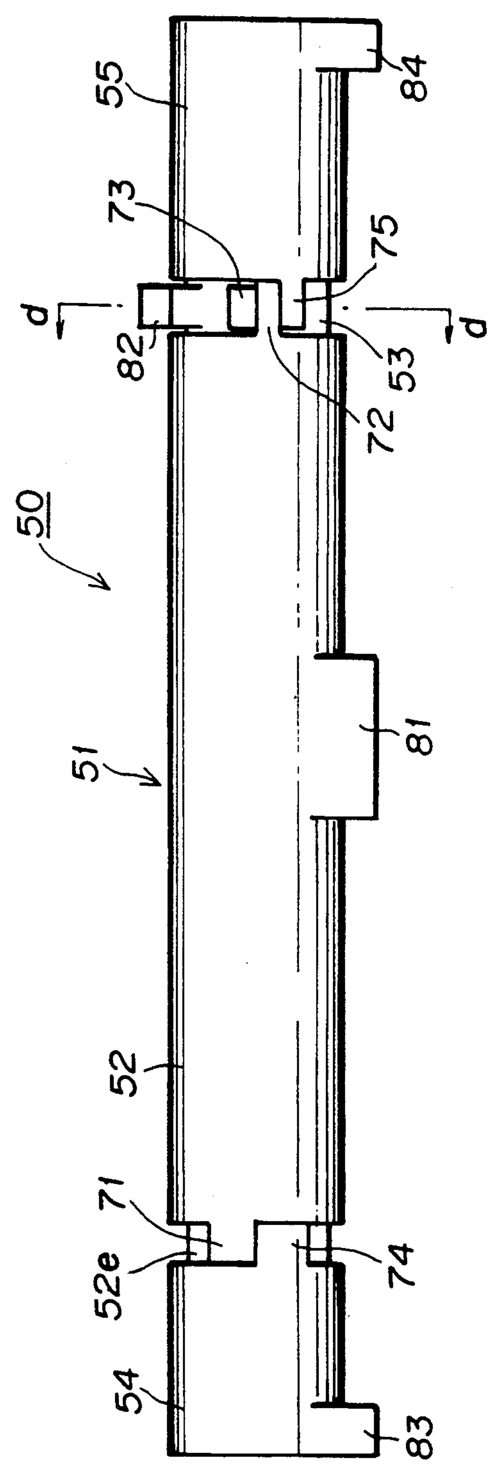
FIG. 5 shows a shaft device which constitutes a slow-acting rotation shaft of another embodiment according to this invention.
Figure 5C:
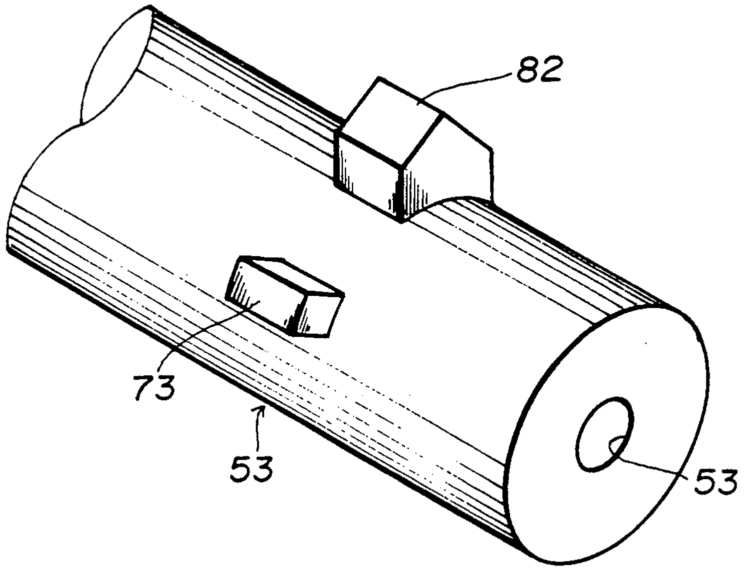
Figure 5:
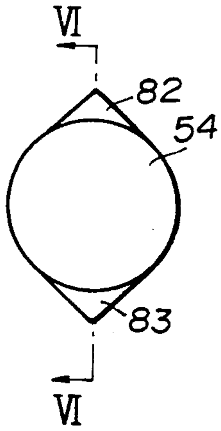
Figure 5D:
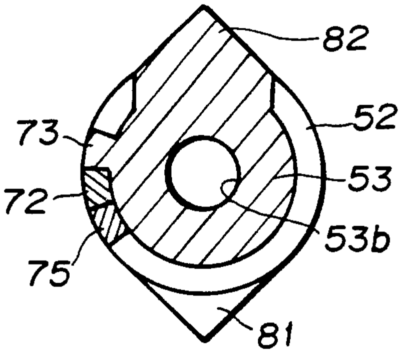

At the outside of the middle portion the second hollow shaft body 53, a key 82 is projectively formed toward the diameter direction thereof (FIG. 5(*a*)(*c*) and (*d*)). Further, at the circumference wall of the second hollow shaft body 53, a latching pawl 73 is projectively formed in the outer circumference direction separating from the key 82. Furthermore, at the interconnected portion of the large diameter circular hole 53d and the small diameter circular hole 53e of the penetrated hole, a slit hole 53f is formed.

Furthermore, a shaft body 51 is formed by inserting the shaft portion 53c of the second hollow shaft body 53 (left side shaft portion of the key 82 in FIG. 2) in the large diameter circular hole 52a of the first hollow shaft body 52 rotatably.

At the time of the insertion of the shaft portion 53c into the large diameter circular hole 52a, when the viscous grease 70 is applied around the circumference of the shaft portion 53c, the viscous grease 70 is enclosed between the first hollow shaft body 52 and the second hollow shaft body 53 of the inserted part at the same time of the insertion thereof.

In the shaft body 51, the key formed at the second hollow body 53 is projected more than the projection of the outer diameter of the first hollow shaft body 52 and the latching pawl 73 formed at the second hollow shaft body 52 is approximately the same as the outer of the first hollow shaft body 52.

At both sides of the shaft body 51 thus incorporated, the cap members 54 and 55 consists of a cylinder having a bottom are inserted. The cap members 54 and 55 are rotatably inserted to the small diameter shaft portion 52e of the first hollow shaft 52 and the shaft portion 53c of the second hollow shaft body 53 (right side shaft portion from the position of key 82 in FIG. 2).

At the bottom of the cap members 54 and 55, slit holes 54a and 55b are formed (Please see FIG. 6).

At the outsides of the cylindrical bodies of the cap members 54 and 55, keys 83 and 84 are projectively formed respectively, and at the opening ends thereof projections for stopping the rotations 74 and 75 are projectingly formed in the shaft direction respectively; when each cap member 54 and 55 are inserted to the shaft body 51, the above projections 74 and 75 are inserted to be positioned at the same side with the latching projections 71 and 72 of the first hollow shaft body and at the opposite side with the latching pawl 73 of the second hollow shaft body. By this, after insertion thereof, the latching projection 72 of the first hollow shaft body is positioned between the latching pawl 73 and the projection for stopping the rotation 75.

In the shaft 50 thus incorporated is inserted the torsion bars 61 and 62 therein.

The torsion bar 61 is attached by latching one end hook portion 61a thereof to the slit hole 54a of the cap member 54, while latching another end hook portion 61b thereof to the slit hole 53f of the second hollow shaft body 53.

Further, another torsion bar 62 is attached by latching one end hook portion 62a thereof to the slit hole 52d of the first hollow shaft 52, while latching another end hook portion 62b to the slit hole 55a of the other cap member 55.

Thus, in the torsion bars 61 and 62, the spring torques are adapted to operate between the cap member 54 and the second hollow shaft body 53, and between the cap member 55 and the first hollow shaft body 52.

This shaft 50 is attached to the rotatably supporting portion of the switch device A shown in FIG. 3 and FIG. 4 as same as the above shaft 50.

In other words, the shaft 50 is penetrated through the shaft supporting portion 5*a* of the upper lid 5, the shaft supporting portions 6*a* and 6*b* of the middle lid 6 and bearing portions 7*a* and 7*b* of the fixed member 7, and further the keys 81, 82, 83 and 84 are respectively latched to key grooves formed at the shaft supporting portion 5*a*, the shaft supporting portions 6*b*, the bearing portion 7*a* and the bearing portion 7*b*, thereby being attached.

In the shaft 50 thus attached, the cap members 54, 55, the first hollow shaft body 52, and the second hollow shaft body 53 are respectively attached to the bearing portions 7*a*, 7*b* of the fixed member 7, the upper lid 5 and the middle lid 6 unrotatably. At this time, the upper lid 5 is energized in an open direction by the torsion bar 62, while the middle lid 6 is energized in an open direction by the torsion bar 6*i*.

Thus, the upper lid 5 and the middle lid 6 pivot in open direction by the spring torques of the torsion bars 62 and 61 respectively and at this pivot the viscous resistances of the viscous grease occurs.

The pivot of the upper lid 5 operates to open at the same time or prior to the middle lid 6. The maximum opening angle of the upper lid 5 at this time is constrained by the fact that the latching projections 71 and 72 formed at both ends of the first hollow shaft body 52 abut against the projections for stopping the rotation 74 and 75 of the cap members 54 and 55 attached to the bearing portions 7*a* and 7*b* of the fixed member 7 unrotatably. Further, the maximum opening angle of the middle lid 6 is constrained by the fact that the latching pawl 73 formed at the second hollow shaft body 53 abuts against the latching projection 75 which constrains the rotation more than that of the first hollow shaft body by abutment of the latching pawl 73 against the projection for stopping the rotation 75 (See FIG. 5(*a*)).

When the upper lid 5 and the middle lid 6 is adapted to be shut, since the both lids are operated in shutting directions at the same time the operation is performed at a stretch against the spring torques of the torsion bars 61 and 62 without relation of the viscous resistance of the viscous grease 70.

Further, the torsion bars 61 and 62 are provided the initial torques as follows.

The initial torque is adjusted at the time of incorporation of the ca members 54 and 55 to the shaft body 51.

First, a case wherein the torsion bar 61 is provided the initial torque will be described as follows.

After holding the first hollow shaft body 52 which constitutes the shaft body 51 with a suitable means to lock the rotation thereof, one cap member 54 is inserted rotatably around the small shaft portion 52*e* of the first hollow shaft body. At this time, the insertion of the cap member 54 is shallow to an extent wherein the projection for stopping the rotation 74 does not abut against the latching projection 71 of the first hollow shaft body. In this state, one end of the hook portion 61*a* is latched to the slit hole 54 of the cap member 54, while another end of the hook portion 61*b* is latched to the slit hole 53*f* of the second hollow shaft body 53. Then, the torsion bar 61 is twisted suitably by rotation of the cap member 54. At the time of this twisting, though the second hollow shaft body 53 is forced to rotate in this twisting direction, its rotation is prevented by the fact that the latching pawl 73 projected on the second hollow shaft body 53 latches to the latching projection 72 of the first hollow body whereby the torsion bar 61 is twisted properly. Then, the cap member 54 is pulled to be inserted in the small diameter shaft portion 52*e* maintaining the twisting state. This inserting state is shown in FIG. 5(*a*). In this state, even if the cap member 54 intends to rotate in the opposite direction against the second hollow shaft body 53 by reaction force of the torsion bar, the projection for stopping the rotation 74 of the cap member 54 abuts against the latching projection 1 of the first hollow shaft body whereby the above rotation is prevented. When the torque is thus provided to the torsion bar 61, the cap member 54 and the second hollow shaft body 53 are adapted to rotate in opposite directions by the reaction force. However, both rotations are prevented by the fact that the projection for stopping the rotation 74 and the latching pawl 73 respectively abut against the latching projections 71 and 72 positioned at both ends of the first hollow shaft body 52 from the opposite side respectively. Accordingly, even if the holding state of the first hollow shaft body 52 is released, the twisting state of the torsion bar 61 can be maintained. By this, the initial torque can be provided to the torsion bar 61.

Then, the case wherein the initial torque is provided to the torsion bar 62 will be described as follows:

As same as in case of the torsion bar 61 described above, the first hollow shaft body 52 which constitutes the shaft body 51 is held with a suitable means. Another cap member 55 is inserted shallow by to the shaft portion 53*d* of the second hollowed shaft body to the extent wherein the projection for stopping the rotation 75 formed at the cap member 53 does not abut against the latching projection 72 of the first hollow shaft body. In this state, one end hook portion 62*a* of the torsion bar 62 is latched to the slit hole 52*d* of the first hollow shaft body, while another end hook portion 62*b* is latched to the slit hole 55*a* of the cap member 55. Then, the torsion bar is twisted properly by rotating the cap member 55. After that, the cap member 55 is insertly pulled in the shaft portion 53*d* of the second hollow shaft body 53 maintaining the twisting state. This inserting state is shown in FIG. 5(*a*) in which the cap member 55 and the first hollow shaft body 52 is intended to be adapted to rotate in the opposite direction respectively by the reaction force of the torsion bar 62. However, both rotations are prevented by abutment of the projection for stopping the rotation 75 with the latching projection 72 whereby the torsion bar 62 can be maintained in the twisting state even if the first hollow shaft body 52 is released from its holding state. By this the initial torque can be provided to the torsion bar 62.

Thus, the shaft body 50 can be provided the initial torque to the torsion bars 61 and 62 at the assembling time.

By this, the shaft body 50 can be obtained a slow-acting rotation shaft device provided with the initial torque by only being inserted in the rotatably supporting portion of the upper lid 5 and the middle lid 6.

Further, since the torsion bars 62 and 61 which relate to the upper lid 5 and the middle lid 6 respectively can be provided the initial torque independently with no relation to each other by operating them separately, both torsion bars may be provided initial torque having different values respectively.

According to this invention as described above, since this invention relates to a slow-acting rotation shaft device having one shaft type which constitutes a shaft body by connecting the first and the second hollow shaft body concerned in the first and second rotative members respectively so as to be relatively rotatable on the same central shaft line, the attaching space thereof is small thereby being able to apply for a small switch device such as a case for compact disc, a compact case for toiletries or the like.

Furthermore, even in a one shaft device, the speed of each of the two rotative members can be controlled.

The device of this invention is provided with latching projections, projections for stopping the rotation and latching pawls, and can prevent the permanent set of the torsion bar caused by a mistaken operation or a rotation more than the maximum rotation angle thereby being able to obtain a slow-acting rotation shaft device stable for a long period.

Further, since by using the shaft it is possible to provide the initial torque to the shaft itself at the subassembling time, a slow-acting rotation shaft device provided the initial torque can be obtained by only inserting the shaft into the rotatably supporting portion of the rotative member and the assembly thereof is also easy.

What we claim is:

1. A slow-acting rotation shaft device wherein a shaft which rotatably supports first and second rotatable members which each rotate relatively with respect to a fixed member comprises;

a shaft body having a first hollow shaft body latched unrotatably to the first rotatable member and into which a second hollow shaft body is rotatably inserted and said second hollow shaft body latched unrotatably to the second rotatable member;

first and second cap members inserted around the side end portion of the first and the second hollow shaft bodies of the shaft body respectively and rotatably, and attached to the fixed member unrotatably;

first and second torsion bars wherein ends of said first torsion bar are latched to said first cap member and the second hollow shaft body, and said second torsion bar is latched to said second cap member and the first hollow shaft body respectively wherein said first and second torsion bars overlap each other in the shaft body; and a viscous grease enclosed between the first hollow shaft body and the second hollow shaft body inserted in the first hollow shaft body.

2. A slow-acting rotation shaft device according to claim 1 further comprising:

latching projections formed projectively in the shaft directions respectively at both sides of the first hollow shaft body;

projections for stopping the rotation projectively formed at said first and second cap members respectively so as to latch with the above latching projections from the same rotation directions; and a latching pawl formed projectively in the diameter direction to the second hollow shaft body so as to latch to the latching projection of the first hollow shaft body latched to the projection for stopping the rotation of another cap member from opposite side, wherein said latchings provide initial torque to said torsion bars, respectively, and restrain rotation of said first and second shaft bodies relative to each said cap.

* * * * *